United States Patent [19]

Annemaier et al.

[11] Patent Number: 5,453,212
[45] Date of Patent: Sep. 26, 1995

[54] POWDERY HYDROPHOBIC FILLER FOR BITUMINIZED TRAFFIC SURFACES

[75] Inventors: Dieter Annemaier, Illerkirchberg; Stefan Keipl, Bellenberg; Wilhelm Kaemereit, Duesseldorf; Oskar Schmitt, Stolberg, all of Germany

[73] Assignees: ChemischeFabrik Gruenau GmbH; Mannesmann Aktiengesellschaft, Duesseldorf, Germany

[21] Appl. No.: 204,281

[22] PCT Filed: Aug. 28, 1992

[86] PCT No.: PCT/EP92/01986

§ 371 Date: May 4, 1994

§ 102(e) Date: May 4, 1994

[87] PCT Pub. No.: WO93/05233

PCT Pub. Date: Mar. 18, 1993

[30] Foreign Application Priority Data

Sep. 6, 1991 [DE] Germany .................... 41 296 21.4

[51] Int. Cl.⁶ .................................................. E01C 9/00
[52] U.S. Cl. ........................... 252/70; 252/71; 106/461; 106/466; 106/482; 106/788
[58] Field of Search ................. 252/70, 71; 106/461, 106/466, 482, 788

[56] References Cited

U.S. PATENT DOCUMENTS 5,106,520  4/1992  Salyer ........................ 252/70

*Primary Examiner*—Mark L. Bell
*Assistant Examiner*—C. M. Bonner
*Attorney, Agent, or Firm*—Ernest G. Szoke; Norvell E. Wisdom, Jr.; Real J. Grandmaison

[57] ABSTRACT

The invention concerns a powdery, hydrophobic filler for bituminized traffic surfaces, including at least one substance that lowers the freezing point of water.

20 Claims, No Drawings

POWDERY HYDROPHOBIC FILLER FOR BITUMINIZED TRAFFIC SURFACES

FIELD OF THE INVENTION

This invention relates to a powdery hydrophobic filler, based on at least one substance which lowers the freezing point of water, for bitumen-bonded traffic surfaces.

STATEMENT OF RELATED ART

It is known that road surfaces containing substances which reduce the freezing point of water can be prepared in order to prevent ice from forming, particularly at ambient temperatures varying around 0° C., and to facilitate snow clearing operations. For example, DE-OS 24 26 200 describes a bituminous or asphalt-containing preparation for the production of a road surface that inhibits ice formation and melts snow, containing alkaline earth metal halide and alkali metal hydroxide particles incorporated in the structure of the mineral and protected by a water-tight coating of a drying oil or a plastic from the group consisting of polyvinyl acetate, polyvinyl alcohol, epoxy resin or acrylic resin. The thawing effect of these particles, which have a particle size of up to 7 mm, is brought into action after destruction of the oil or plastic coating by the usual abrasion of the road surface by traffic. However, this known preparation has the major disadvantage that the relatively large particles are difficult to disperse uniformly in the other constituents of the road surface, so that the thawing effect obtained is not uniform over the entire area of the road surface. In addition holes in the road surface can be formed by the dissolving out of these large particles and have to be subsequently repaired.

EP 153 269 describes the use, for road surfaces, of a fine particle mixture, with a particle size below 0.2 mm, which, in addition to sodium chloride, contains polyurethane, perlite and optionally carbon black as a hydrophobicizing component. In the fine particle mixture, the percentage content of the hydrophobicizing component is between 5 and 75% by weight of the percentage content of the hydrophilic components.

It is desirable to keep the percentage filler content based on a substance which reduces the freezing point of water in an asphalt mixture relatively low because, on the one hand, minimum quantities of other fillers which do not reduce the freezing point of water, for example mineral powder, are often required although, on the other hand, the permitted total quantity of filler is limited by the particular technical specification. Accordingly, there is an interest in highly effective fillers based on a substance which reduces the freezing point of water. This means that the percentage content of substances reducing the freezing point of water in fillers such as these should be as high as possible. The higher the percentage content of substances which reduce the freezing point of water (hydrophilic substances), the lower the percentage availability of substances which hydrophobicize the hydrophilic substances. However, for the absolutely essential long-term effect of a filler incorporated in a traffic surface, premature leaching of the substances which reduce the freezing point of water must be avoided, i.e. a low extraction rate has to be guaranteed by particularly good hydrophobicization. In addition, such fillers should be stable even at temperatures above 250° C. so that they may readily be incorporated, for example, in bituminous mastic concrete.

DESCRIPTION OF THE INVENTION

Object of the Invention

Accordingly, the problem addressed by the present invention was to provide a filler for bitumen-bonded traffic surfaces which, even in small quantities, would enable such traffic surfaces to be protected much more effectively against freezing over, even in the long term, by comparison with known fillers.

SUMMARY OF THE INVENTION

It has been found that the stringent requirements which a filler of the type in question is expected to meet are satisfied by a powder-form filler based on at least one substance which reduces the freezing point of water and which contains hydrophobicized amorphous silicon dioxide in quantities of 0.1 to 10% by weight.

Accordingly, the present invention relates to a powder-form hydrophobic filler for bitumen-bonded traffic surfaces based on one or more substances which reduce the freezing point of water, the diameter of the filler particles being between >0 and 200 µm, characterized in that the filler contains:

| | |
|---|---|
| 60 to 95% | by weight of one or more substances which reduce the freezing point of water, |
| 0 to 39.9% | by weight of mineral powder and |
| 0.1 to 10% | by weight of one or more hydrophobicized amorphous silicon dioxide. |

DESCRIPTION OF PREFERRED EMBODIMENT

A preferred filler contains:

| | |
|---|---|
| 60 to 95% | by weight of one or more substances which reduce the freezing point of water, |
| 0 to 39.5% | by weight of mineral powder and |
| 0.5 to 5% | by weight of one or more hydrophobicized amorphous silicon oxide. |

A particular preferred filler contains:

| | |
|---|---|
| 80 to 95% | by weight of one or more substances which reduce the freezing point of water, |
| 0 to 19.5% | by weight of mineral powder and |
| 0.5 to 5% | by weight of one or more hydrophobicized amorphous silicon dioxide. |

With a filler according to the invention which may contain up to 95% by weight of one or more substances which reduce the freezing point of water, bitumen-bonded traffic surfaces, more particularly road pavements and airport runways, can be far more effectively protected against icing and hoarfrost. In addition, the extraction rate of the substances reducing the freezing point of water is distinctly reduced by a filler according to the invention, in comparison with a known filler having the same content of substances reducing the freezing point of water, thus lengthening the protection of traffic surfaces against freezing over.

Chlorides and/or sulfates of alkali metals and/or alkaline earth metals and/or urea are particularly suitable for use as the substances which reduce the freezing point of water.

Chlorides of alkali metals are particularly preferred. Examples of suitable chlorides and/or sulfates are sodium, potassium, magnesium and/or calcium chloride and/or sodium, potassium and/or magnesium sulfate.

Suitable hydrophobicized amorphous silicon dioxide are hydrophobicized amorphous silicon dioxide precipitated from aqueous solution and hydrophobicized, amorphous fumed silicon dioxide. Hydrophobicized, amorphous silicon dioxide precipitated from aqueous solution are preferred. The hydrophobicized silicon dioxide have a primary particle size of 5 to 100 μm and preferably 8 to 30 μm and a specific BET surface of preferably 50 to 300 $m^2/g$ and more preferably 50 to 200 $m^2/g$.

To produce a filler according to the invention, the substances reducing the freezing point of water are first ground in such a way that up to 15% by weight of the particles have a diameter of >90 μm. The ground substances reducing the freezing point of water are then homogeneously mixed with one or more hydrophobicized amorphous silicon dioxide and optionally mineral powder. The mineral powder used may be for example, limestone flour, marble flour, lava flour, basalt flour, silica flour and/or slate flour. Limestone flour is preferably used as the mineral powder. In a filler according to the invention, the percentage of particles larger than 90 μm in diameter, as determined by sieving in an air jet sieve, is preferably between 5 and 20% by weight and more preferably between 10 and 15% by weight.

A filler according to the invention is processed in known manner with sand, chips, mineral powder and bitumen to form rolled asphalt or other bitumen-containing mixtures, such as bituminous mastic concrete or mixtures for the treatment and particularly for the repair of road surfaces. The filler content in rolled asphalt is at most 14% by weight and, in other bitumen-containing mixtures, at most 30% by weight.

By virtue of its particle size and its heat resistance up to 280° C., a filler according to the invention can be homogeneously distributed in bitumen-containing mixtures, for example bituminous mastic concrete, in exactly the same way as a mineral powder filler. In addition, a filler according to the invention is stable in storage at temperatures of −20° C. to +60° C. and under high contact pressures, shows high fluidity, is vibration-resistant and does not separate, for example, in pneumatic conveyors.

EXAMPLES

Production of powdery fillers for bitumen-bonded traffic surfaces

The particle sizes of the fillers, the sodium chloride, the lava powder and the limestone stone powder were determined by sieving in an air jet sieve.

Production Example 1

900 g of sodium chloride were ground in a laboratory mill until only 13% by weight of the particles were larger than 90 μm in diameter. The sodium chloride was then homogeneously mixed with 80 g of lava powder (82% by weight of the particles were smaller than 90 μm in diameter) and 20 g of Aerosil®972 (a product of Degussa AG; fumed hydrophobicized silica, primary particle size 16 nm, specific BET surface 110 $m^2/g$). 13% by weight of the particles in the filler obtained were larger than 90 μm in diameter.

Production Example 2

A filler containing 20 g of Sipernat®D 17 (a product of Degussa AG; hydrophobicized amorphous precipitated silica, primary particle size 28 nm, specific BET surface 110 $m^2/g$) instead of 20 g of Aerosil®972 was produced under the conditions described in Production Example 1. 13.4% by weight of the particles in the filler obtained were larger than 90 μm in diameter.

Production Example 3

A filler containing 20 g of an amorphous fumed silicon dioxide (specific BET surface 105 $m^2/g$) hydrophobicized with methyl hydrogen polysiloxane and dioctyl tin dilaurate in a ratio by weight of 10:1 instead of 20 g of Aerosil®972 was produced under the conditions described in Production Example 1. 13% by weight of the particles in the filler obtained were larger than 90 μm in diameter.

Production Example 4

A filler containing 20 g of an amorphous precipitated silicon dioxide (specific BET surface 77 $m^2/g$) hydrophobicized with methyl hydrogen polysiloxane and dioctyl tin dilaurate in a ratio by weight of 10:1 instead of 20 g of Aerosil®972 was produced under the conditions described in Production Example 1. 11.7% by weight of the particles in the filler obtained were larger than 90 μm in diameter.

Production Example 5

A filler was produced from 600 g of sodium chloride, 380 g of lava powder and 20 g of an amorphous precipitated silicon dioxide (specific BET surface 77 $m^2/g$) hydrophobicized with methyl hydrogen polysiloxane and dioctyl tin dilaurate in a ratio by weight of 10:1 under the conditions described in Production Example 1. 14.7% by weight of the particles in the filler obtained were larger than 90 μm in diameter.

Production Example 6

A filler containing 380 g of limestone flour (82% of the particles were smaller than 90 μm in diameter) instead of 380 g of lava flour was produced under the conditions described in Production Example 5. 14.7% by weight of the particles in the filler obtained were larger than 90 μm in diameter.

Production Example 7 (Prior Art)

600 g of sodium chloride were ground in a laboratory mill until only 15% by weight of the particles were larger than 90 μm in diameter. The ground sodium chloride was then homogeneously mixed with 280 g of lava flour (82.8% by weight of the particles were smaller than 90 μm in diameter), 100 g of rigid polyurethane foam (25% by weight of the particles were smaller than 90 μm in diameter) and 20 g of carbon black (92.8% by weight of the particles were smaller than 90 μm in diameter). 20.6% by weight of the particles in the filler obtained were larger than 90 μm in diameter.

Production Example 8 (Control)

600 g of sodium chloride were ground in a laboratory mill until only 13% by weight of the particles were larger than 90 μm in diameter. The sodium chloride was then homogeneously mixed with 400 g of lava flour (82% by weight of the particles were smaller than 90 μm in diameter). 14.1% by weight of the particles in the filler obtained were larger than 90 μm in diameter.

Determination of the hydrophobic properties of the filler

The hydrophobic properties were determined in accordance with ISO 7202, 01.06.1987 Edition (Fire Protection—Fire Extinguishing Media Powder § 12.6) after 45 minutes. A "positive" evaluation means that the requirements of ISO 7202 were satisfied after 45 minutes; a "negative" evaluation means that the requirements of ISO 7202 were not satisfied after 45 minutes. In addition, the time taken by water droplets to disappear completely was determined. The results are set out in Table 1.

Determination of the quantity of chloride extracted by water from asphalt test specimens (Marschall specimens)

A Marschall test specimen was made from 360 g of basalt chips (particle size 8 to 11 mm)
120 g of basalt chips (particle size 8 to 5 mm)
180 g of basalt chips (particle size 2 to 5 mm)
444 g of basalt screenings (particle size 0.09 to 2 mm)
36 g of limestone flour (particle size 0 to 0.09 mm)
60 g of a filler according to the invention and
72 g of bitumen B 80 in accordance with DIN 1996. The Marschall test specimen was placed in 2 liters of distilled water and the water containing chloride ions was replaced at regular intervals by distilled water. After 48 and 192 hours, the chloride content of the waters containing chloride ions was determined by precipitation of silver chloride. The smaller the amount of chloride extracted, the longer the expected duration of the freezing-over protection of the Marschall test specimens. The results are set out in Table 1.

TABLE I

| Filler According to Production Example No.: | Determination of Hydrophobic Properties | | Quantity of Chloride Extracted | | | |
|---|---|---|---|---|---|---|
| | | | After 48 Hr. | | After 192 Hr. | |
| | Droplet Drainage after 45 min. | Min. for Complete Disappearance of Water Droplet | In mg. | As % by Weight of Total Chloride | In mg. | As % by Weight of Total Chloride |
| 1 | Positive | 270 | 1210 | 2.2 | 2660 | 4.9 |
| 2 | Positive | 240 | 1150 | 2.1 | 2050 | 3.7 |
| 3 | Positive | 270 | 1350 | 2.5 | 2880 | 5.3 |
| 4 | Posifive | 300 | 1220 | 2.2 | 2270 | 4.2 |
| 5 | Positive | 270 | 700 | 1.9 | 1590 | 4.4 |
| 6 | Positive | 270 | 720 | 2.0 | 1300 | 3.6 |
| 7(Prior art) | Negative | 105 | 1150 | 3.1 | 2200 | 6.1 |
| 8(Control) | Negative | 1 | 1310 | 3.6 | 2560 | 7.1 |

The invention claimed is:

1. A powdery hydrophobic filler composition for bitumen-bonded traffic surfaces wherein the diameter of the filler particles is between >0 and 200 μm, said filler comprising:

60 to 95% by weight of one or more solid substances which reduce the freezing point of water, >0 to 39.9% by weight of mineral powder and 0.1 to 10% by weight of powder form hydrophobicized amorphous silicon dioxide.

2. A filler composition as claimed in claim 1, comprising:

60 to 95% by weight of one or more solid substances which reduce the freezing point of water, >0 to 39.5% by weight of mineral powder and 0.5 to 5% by weight of powder form hydrophobicized amorphous silicon dioxide.

3. A filler composition as claimed in claim 2, comprising:

80 to 95% by weight of one or more solid substances which reduce the freezing point of water, >0 to 19.5% by weight of mineral powder and 0.5 to 5% by weight of powder form hydrophobicized amorphous silicon dioxide.

4. A filler composition as claimed in claim 3, wherein the substance which reduces the freezing point of water is selected from the group consisting of alkaline earth chlorides, alkali metal chlorides, alkali metal sulfates, alkaline earth sulfates and urea.

5. A filler composition as claimed in claim 4, wherein the silicon dioxide has been precipitated from an aqueous solution.

6. A filler composition as claimed in claim 5, wherein the mineral powder in limestone powder.

7. A filler composition as claimed in claim 2, wherein the substance which reduces the freezing point of water is selected from the group consisting of alkaline earth chlorides, alkali metal chlorides, alkali metal sulfates, alkaline earth and urea.

8. A filler composition as claimed in claim 1, wherein the substance which reduces the freezing point of water is selected from the group consisting of alkaline earth chlorides, alkali metal chlorides, alkali metal sulfates, alkaline earth sulfates and urea.

9. A filler composition as claimed in claim 8, wherein the silicon dioxide has been precipitated from an aqueous solution.

10. A filler composition as claimed in claim 7, wherein the silicon dioxide has been precipitated from an aqueous solution.

11. A filler composition as claimed in claim 3, wherein the silicon dioxide has been precipitated from an aqueous solution.

12. A filler composition as claimed in claim 2, wherein the silicon dioxide has been precipitated from an aqueous solution.

13. A filler composition as claimed in claim 1, wherein the silicon dioxide has been precipitated from an aqueous solution.

14. A filler composition as claimed in claim 13, wherein the mineral powder is limestone flour.

15. A filler composition as claimed in claim 12, wherein the mineral powder is limestone flour.

16. A filler composition as claimed in claim 11, wherein the mineral powder is limestone flour.

17. A filler composition as claimed in claim 10, wherein the mineral powder is limestone flour.

18. A filler composition as claimed in claim 9, wherein the mineral powder is limestone flour.

19. A filler composition as claimed in claim 4, wherein the mineral powder is limestone flour.

20. A filler composition as claimed in claim 3, wherein the mineral powder is limestone flour.

* * * * *